(12) United States Patent
Han (10) Patent No.: US 9,490,736 B2
(45) Date of Patent: Nov. 8, 2016

(54) ADJUSTABLE ASSEMBLY OF ROTOR AND STATOR AND APPLICATIONS THEREOF WITH A VARIABLE POWER GENERATOR

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

(*) Notice: Subject to any disclaimer, the term of this patent is extended or adjusted under 35 U.S.C. 154(b) by 0 days.

(21) Appl. No.: 14/829,354

(22) Filed: Aug. 18, 2015

(65) Prior Publication Data

US 2015/0357951 A1 Dec. 10, 2015

Related U.S. Application Data (60) Continuation-in-part of application No. 14/255,377, filed on Apr. 17, 2014, now Pat. No. 9,151,269, which is a continuation-in-part of application No. 13/915,785, filed on Jun. 12, 2013, now Pat. No. 8,702,552, which is a division of application No.

(Continued)

(51) Int. Cl.
*H02K 21/24* (2006.01)
*H02P 9/02* (2006.01)

(Continued)

(52) U.S. Cl.
CPC ............... *H02P 9/02* (2013.01); *B60L 11/14* (2013.01); *B60L 15/2054* (2013.01); *F03B 13/264* (2013.01); *F03B 15/08* (2013.01); *F03B 15/12* (2013.01); *F03B 17/06* (2013.01); *F03D 9/002* (2013.01); *F03D 15/00* (2016.05); *B60L 2210/30* (2013.01); *B60L 2210/40* (2013.01); *B60L 2220/14* (2013.01); *B60L 2240/421* (2013.01); *B60L 2240/423* (2013.01); *B60L 2240/425* (2013.01); *B60L 2240/486* (2013.01); *F05B 2260/40311* (2013.01); *Y02E 10/28* (2013.01); *Y02E 10/722* (2013.01); *Y02E 10/725* (2013.01); *Y02T 10/645* (2013.01); *Y02T 10/648* (2013.01); *Y02T 10/70* (2013.01); *Y02T 10/7077* (2013.01); *Y02T 10/7241* (2013.01); *Y02T 10/7275* (2013.01); *Y10T 74/18056* (2015.01); *Y10T 74/2101* (2015.01)

(58) Field of Classification Search
CPC .................................................. H02K 21/024
USPC .............................................. 322/20; 310/191
See application file for complete search history.

(56) References Cited

U.S. PATENT DOCUMENTS 2,484,197 A * 10/1949 Veldhuis ................ F03D 9/002
290/44
4,695,736 A * 9/1987 Doman ................. F03D 7/0272
290/44

(Continued)

FOREIGN PATENT DOCUMENTS

JP        2008208959 A  *  9/2008
SE        WO 8101444 A1 *  5/1981 ............... F03D 7/02

*Primary Examiner* — Joseph Waks
(74) *Attorney, Agent, or Firm* — Cameron LLP (57) ABSTRACT

A variable power generator comprises one of a stator and a rotor which is adjustably movable through an infinite number of positions from being proximate to one another so that their magnetic fields overlap to a position such that the rotor is most distant from the stator and has little overlap of magnetic field strength. The variable power generator in operation may comprise one of a rotor and a stator being out of phase with one another by an angle, for example, the one of the rotor or the stator leading or lagging the other. In this instance, a motor such as a servo motor may be used to rotationally compensate for the out-of-phase angle by radially moving the rotor with respect to the stator or vice versa.

20 Claims, 10 Drawing Sheets

Control Circuit of VPG, Hatch, and Synchronization

Related U.S. Application Data

13/568,288, filed on Aug. 7, 2012, now Pat. No. 8,485,933, which is a continuation-in-part of application No. 13/425,501, filed on Mar. 21, 2012, now Pat. No. 8,641,570, which is a continuation-in-part of application No. 13/384,621, filed as application No. PCT/US2010/042519 on Jul. 20, 2010, now Pat. No. 8,388,481.

(60) Provisional application No. 62/039,096, filed on Aug. 19, 2014, provisional application No. 61/521,408, filed on Aug. 9, 2011, provisional application No. 61/523,846, filed on Aug. 16, 2011.

(51) Int. Cl.

| | | |
|---|---|---|
| *F03B 13/26* | (2006.01) | |
| *F03B 15/08* | (2006.01) | |
| *F03B 15/12* | (2006.01) | |
| *F03B 17/06* | (2006.01) | |
| *B60L 11/14* | (2006.01) | |
| *B60L 15/20* | (2006.01) | |
| *F03D 9/00* | (2016.01) | |

(56) References Cited

U.S. PATENT DOCUMENTS

| | | | | |
|---|---|---|---|---|
| 6,064,161 | A * | 5/2000 | Takahara | B60W 10/04 180/197 |
| 6,537,168 | B1 * | 3/2003 | Han | F16H 29/04 475/8 |
| 6,555,941 | B1 * | 4/2003 | Zepp | H02K 21/024 310/114 |
| 6,943,478 | B2 * | 9/2005 | Zepp | H02K 7/12 310/191 |
| 7,462,124 | B2 * | 12/2008 | Han | F16H 3/721 475/270 |
| 7,804,263 | B2 * | 9/2010 | Himmelmann | H02K 7/12 290/34 |
| 2002/0068658 | A1 * | 6/2002 | Suzuki | F16D 7/028 475/257 |
| 2007/0082779 | A1 * | 4/2007 | Han | F16H 3/721 475/325 |
| 2013/0043686 | A1 * | 2/2013 | Eitan | F03D 11/02 290/55 |

* cited by examiner

Figure 1: Perspective View of a Variable Power Generator

Figure 3: Electronically-controlled Variable Power Generator

Figure 4A: Left View   Figure 4B: Front View   Figure 4C: Right View

Figure 5: Transgear-controlled Variable Power Generator

Figure 6A: Concentric Cam    Figure 6B: Eccentric Cam

Figure 9: Control Circuit of VPG, Hatch, and Synchronization

ADJUSTABLE ASSEMBLY OF ROTOR AND STATOR AND APPLICATIONS THEREOF WITH A VARIABLE POWER GENERATOR

CROSS-REFERENCE TO RELATED APPLICATIONS

This application claims the benefit of priority to U.S. Provisional Patent Application Ser. No. 62/039,096 filed Aug. 19, 2015 and is a continuation-in-part of U.S. patent application Ser. No. 14/255,377 filed Apr. 17, 2014 (now U.S. Pat. No. 9,151,269 issued Oct. 6, 2015), which is a continuation-in-part of U.S. patent application Ser. No. 13/915,785 filed Jun. 12, 2013, (now U.S. Pat. No. 8,702,552 issued Apr. 22, 2014), which is a divisional of U.S. patent application Ser. No. 13/568,288 filed Aug. 7, 2012 (now U.S. Pat. No. 8,485,933 issued Jul. 16, 2013) which claims the benefit of priority to U.S. Patent Application Ser. No. 61/521,408 filed Aug. 9, 2011, and to U.S. Patent Application Ser. No. 61/523,846 filed Aug. 16, 2011 and U.S. application Ser. No. 13/568,288 filed Aug. 7, 2012 is a continuation-in-part of U.S. patent application Ser. No. 13/425,501, filed on Mar. 21, 2012, (now U.S. Pat. No. 8,641,570 issued Feb. 4, 2014) which is a continuation-in-part of U.S. patent application Ser. No. 13/384,621, entitled "Apparatus and Method for Providing a Constant Output from a Variable Flow Input" filed Jan. 18, 2012, (now U.S. Pat. No. 8,388,481 issued Mar. 5, 2013), being a national stage entry application of PCT US 10/42519 having an international filing date of Jul. 20, 2010, all applications of Kyung Soo Han and being incorporated herein by reference as to their entire contents.

TECHNICAL FIELD

The field of the invention relates to applications of a variable torque generator (VTG) which in power generation applications shall be referred to as a variable power generator (VPG) and, more particularly, to the applications of a variable power generator in adjustable assemblies of rotors and stators, for example, in environmental sources of energy such as wind and marine hydrokinetic turbines for generating constant frequency output power, the VTG/VPG also being useful, for example, in pumps, electric vehicles and internal combustion engines.

BACKGROUND OF THE INVENTION

A variable torque generator has been described in priority U.S. Pat. Nos. 8,338,481; 8,485,933; and 8,702,552 as well as priority PCT/US2010/042519 published as WO2011/011358. The variable torque generator has one of an axially moveable rotor and stator with respect to its stationary or moveable counterpart stator or rotor so as to vary the amount of overlap by the stator with respect to the rotor from a minimum when the stator is displaced from the rotor to a maximum value when the stator and rotor are proximate to or overlap one another.

In particular, there is described in, for example, WO2011/011358 or U.S. Pat. No. 8,338,481 (the U.S., '481 patent), the concept of measuring torque/rpm on an output shaft of a system such as a wind or river/tidal/ocean wave/ocean current turbine (which may be referred to herein as a marine hydrokinetic (MHK) turbine) for providing a constant output from a variable flow input. The measured torque/rpm value may be compared with a torque/rpm value stored in a memory and, if the measured torque/rpm is high in comparison, then, the moveable rotor or stator of a variable torque generator may be moved axially to a position more in keeping with the high measured torque/rpm value, i.e. such that the stator is moved away from the rotor axially under motor control through a feedback loop. When the measured torque/rpm is low in comparison with an expected value, the moveable rotor or stator may be moved axially toward one another to match a low value of torque/rpm so that the speed of the output shaft may increase and vice versa. This variable torque generator process continues so as to maintain a relationship between speed of input (such as wind or river/tide/ocean wave/ocean current) to match a desired rotational speed of output shaft and to maintain output shaft speed, for example, if used as an electric power generator, to produce 60 Hz U.S. electric frequency or in Europe 50 Hz European frequency electric power.

In either the '481 U.S. patent or the WO 2011/011358 printed publication priority documents, FIG. 8 shows the concept of an infinitely variable torque generator, meaning that the one of the moveable rotor or the stator may be moved, for example, by a servo motor, not shown, to any position of proximity to or distance from one another or such that their respective magnetic flux fields are located far away from one another so as to not couple with one another or to couple with one another, for example, to have an effect to cause a coupling of rotor and stator and a magnetic force field tending to cause the rotor to be stationary with the stator or move with the stator. In FIG. 10, the rotor and stator of the variable torque generator are shown such that the rotor 810 is directly coupled to the shaft 820. "When the stator parts 830(*a*) and 830(*b*) are moved away from rotor 810, a minimum input torque results. The operation of a control may be as follows via measuring a torque value stored in memory proximate to the maximum torque that a given rotor shaft 820 may receive (a maximum allowable torque value), the stator parts 830(*a*) and 830(*b*) may be moved by a motor (not shown) to be in removed torque position or a position in between maximum and minimum torque positions whereby a close-to-maximum torque position may be achieved in relation to the measured torque and the maximum allowable torque(/rpm) value or value stored in memory."

There remains a need in the art to provide applications of such a variable torque/power generator assembly in connection with the generation of electrical energy/power (VPG) from renewable sources such as wind and river/tide/ocean wave/ocean current among other possible applications such as in vehicle engines.

SUMMARY OF THE PREFERRED EMBODIMENTS

Embodiments of a variable power generator (VPG) associated with wind and river/tide/ocean wave/ocean current, marine hydrokinetic (MHK) turbine equipment or a motor/engine such as one for a pump, an electric vehicle or other application comprise a VTG/VPG Extension to variable torque motors (VIM), also referred to herein as variable power motors (VPM), wherein there may be an adjustment of the relative axial overlap between the rotor and stator to control speed and torque independently. A suggested application for such a device is in the development of electric generators and motors for an electrically powered vehicle such as the Tesla developed by Elon Musk. A further application is in the potential application of VPG in wind and river/tidal/ocean wave/ocean current (MHK) turbines.

In wind and MHK turbines, a speed converter is used for the purposes of adjusting the speed of the input which may be slow or fast depending on the rate of wind or river velocity with respect to a desired constant output speed (rotational velocity or electric power frequency) for generating power to be fed to a power grid. The embodiment considered provides mechanical synchronization of variable input to constant output. In particular, it is suggested that there be an adjustment of the relative angular (radial) relationship between the rotor and stator in addition to the concept of adjusting the (axial) position lengthwise of a moveable rotor or stator in a VTG or VPG for variable torque with input velocity and desired output frequency. This concept is especially useful for mechanical speed converters for synching the phase angle of variable input with, for example, a desired constant output velocity (convertible to electric power frequency, for example, at 60 Hz US and 50 Hz European).

A further practical application of VPG is to provide a reciprocating input to a variable power generator for generating electricity with a reciprocating rotor. This concept eliminates the need for Sprags from the speed converter described in the priority patent applications and patents, and reduces cost, weight, size, and potential validation time.

A further practical application of VPG is to provide a reactive VTG with respect to waterwheel control in a river/tidal/ocean wave/ocean current, marine hydrokinetic (MHK) turbine. In this embodiment, the VPG may increase torque to the generator in MHK or wind turbines (or any variable load) for control of a waterwheel (or propeller/blades) or hatch of such a MHK turbine. In a MHK turbine, the reactive torque control may be applied to control waterwheel speed until reactive control reaches a designed maximum and then hatch control may be used for further waterwheel speed control with respect to desired output electrical power frequency.

Figure 1:
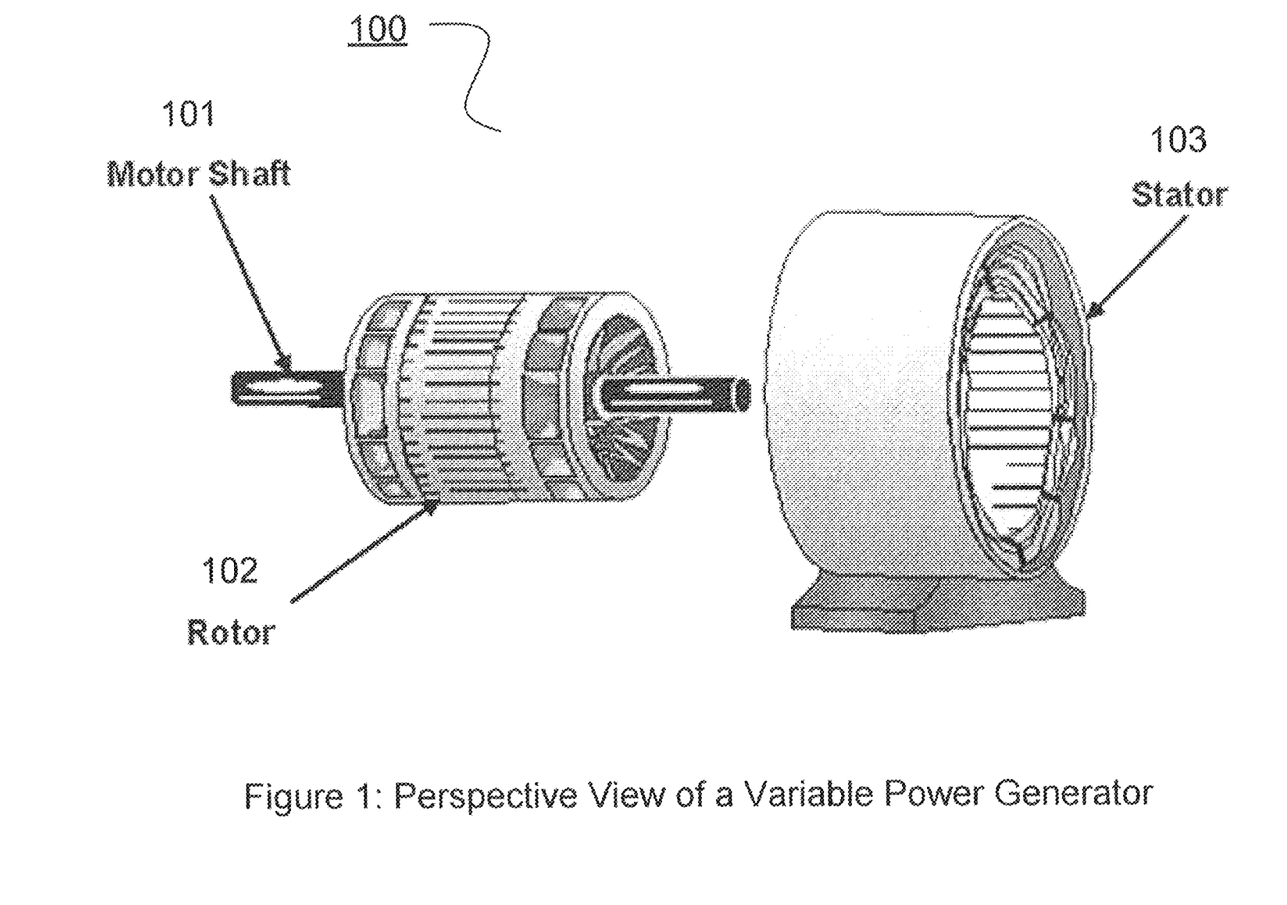
FIG. 1 is a perspective view (an exaggerated view to emphasize the variable overlap of rotor and stator) of a variable power generator (VPG).
Figure 2A:
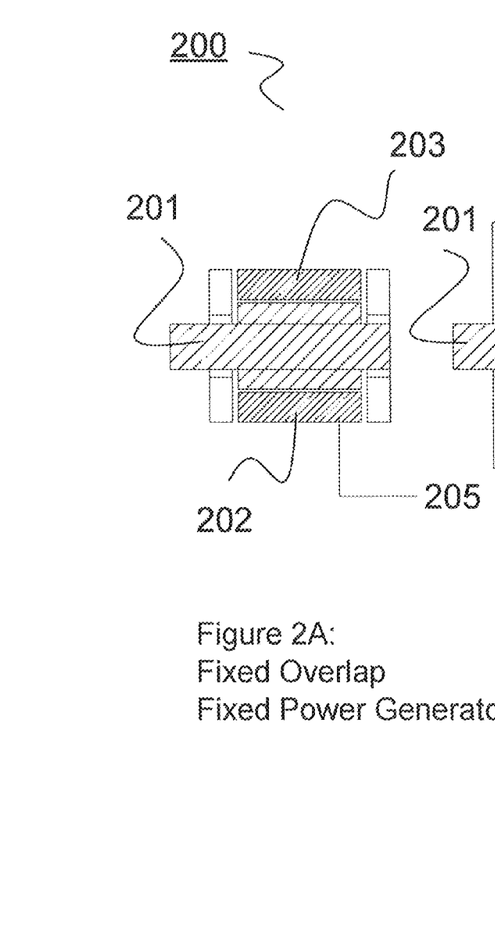
FIG. 2A represents a fixed overlap embodiment 200 with no adjustability between shaft 201, rotor 202 and stator 203.
Figures 2B, 2C:
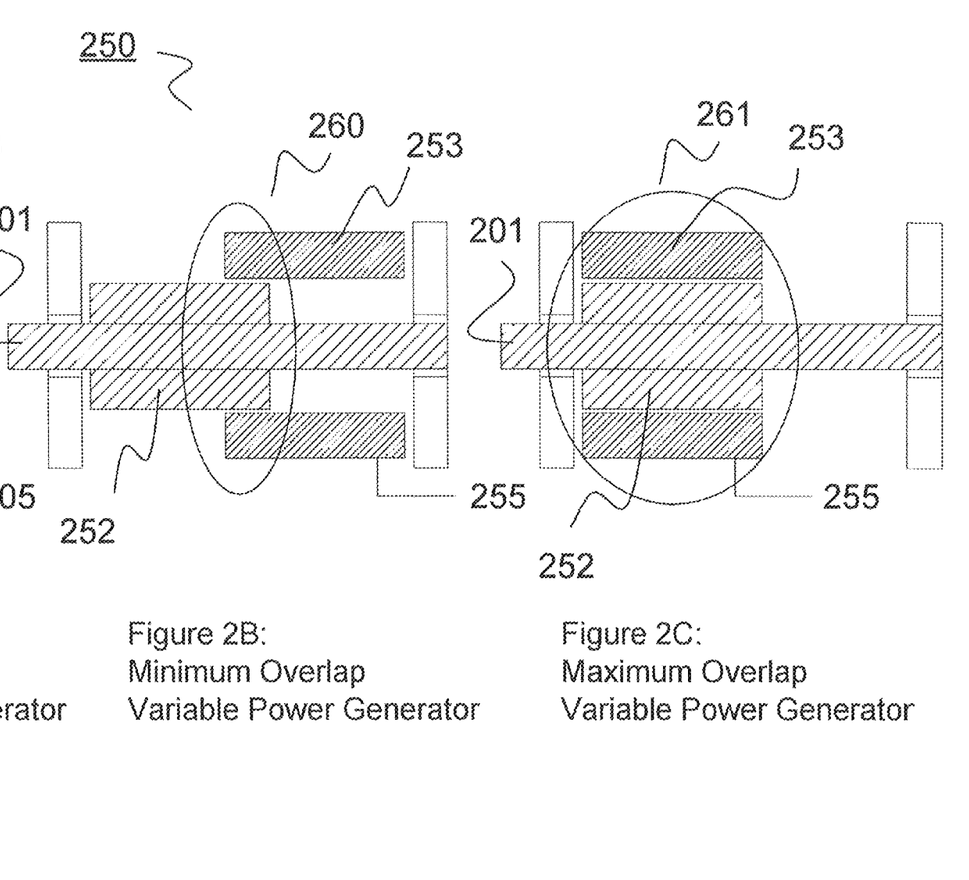
FIG. 2B shows minimum overlap 260 between a shaft 201/rotor 252 and a stator 253 and FIG. 2(C) shows maximum overlap 261 (maximum torque/power) between a rotor 252 and a stator 253.

A variable torque/power generator useful in all embodiments for controlling torque/rpm from a maximum to a minimum is shown in perspective view in FIG. 1 (exaggerated perspective view to show the movability) and in FIG. 2A (fixed rotor and stator with maximum torque). FIG. 2B (showing rotor and stator displaced from one another for minimum overlap) and FIG. 2C (showing rotor and stator coupled magnetically or electromagnetically for maximum overlap). The utilization of a variable power generator as shown in FIG. 1 has been validated by the University of Maryland, Baltimore County, as a useful control device for controlling output shaft rotational velocity at a constant value with respect to a variable input shaft rotational velocity. For steady flowing streams and rivers, without much flow rate variation, a constant speed output can be easily produced by compensating the input. In wind turbine applications, considerable more control is required due to the more extreme variation in wind velocity from practically a calm wind to a high velocity storm wind. As shown in FIG. 2B or 2C, a constant speed, variable torque/power generator 250, comprises rotor shaft 201 on which may be displaced a moveable stator 253 to positions of minimum overlap 260 with rotor 252 (FIG. 2B) to medium overlap (not shown) and maximum overlap 261 with rotor 252 in FIG. 2C. (There may be an infinite number of positions between minimum overlap 260 and maximum overlap 261 but minimum and maximum positions are shown by way of example). Shaft 201/rotor 252 may be connected to a pump, variable transformer, engine, generator or other device or wind or river/tidal/ocean wave/ocean current (MHK) turbine as discussed above. Note that in an alternative embodiment a rotor may be moveable with respect to the stator if needed to achieve minimum, medium and maximum torque. These variable torque/power generators (VTG's or VPG's) may be added to an input compensating IVMC (Infinitely Variable Motion Converter) with a speed converter, for example, to output electric power to a grid at constant frequency.

In MHK turbines, for example, the VPG may be used to advantage regulating output shaft rotational velocity to a constant value. Per FIG. 3, an output shaft 310 may have its output rotational velocity monitored by, for example, a tachometer or other rotational speed detector as an integral part of control box 306 and used to regulate the VPG comprising shaft 310/rotor 303 and stator 304 having power output 305. Control box 306 actuates servo motor 307, for example, worm 308 attached to the motor shaft 311 and worm gear 309 or other equivalent shaft and gear arrangement to axially adjust the stator 304 position with the rotor 303 without a back flow. Output 305 will be connected to the power grid at a desired electric power frequency (such as 60 Hz US and 50 Hz European).

Figure 5:
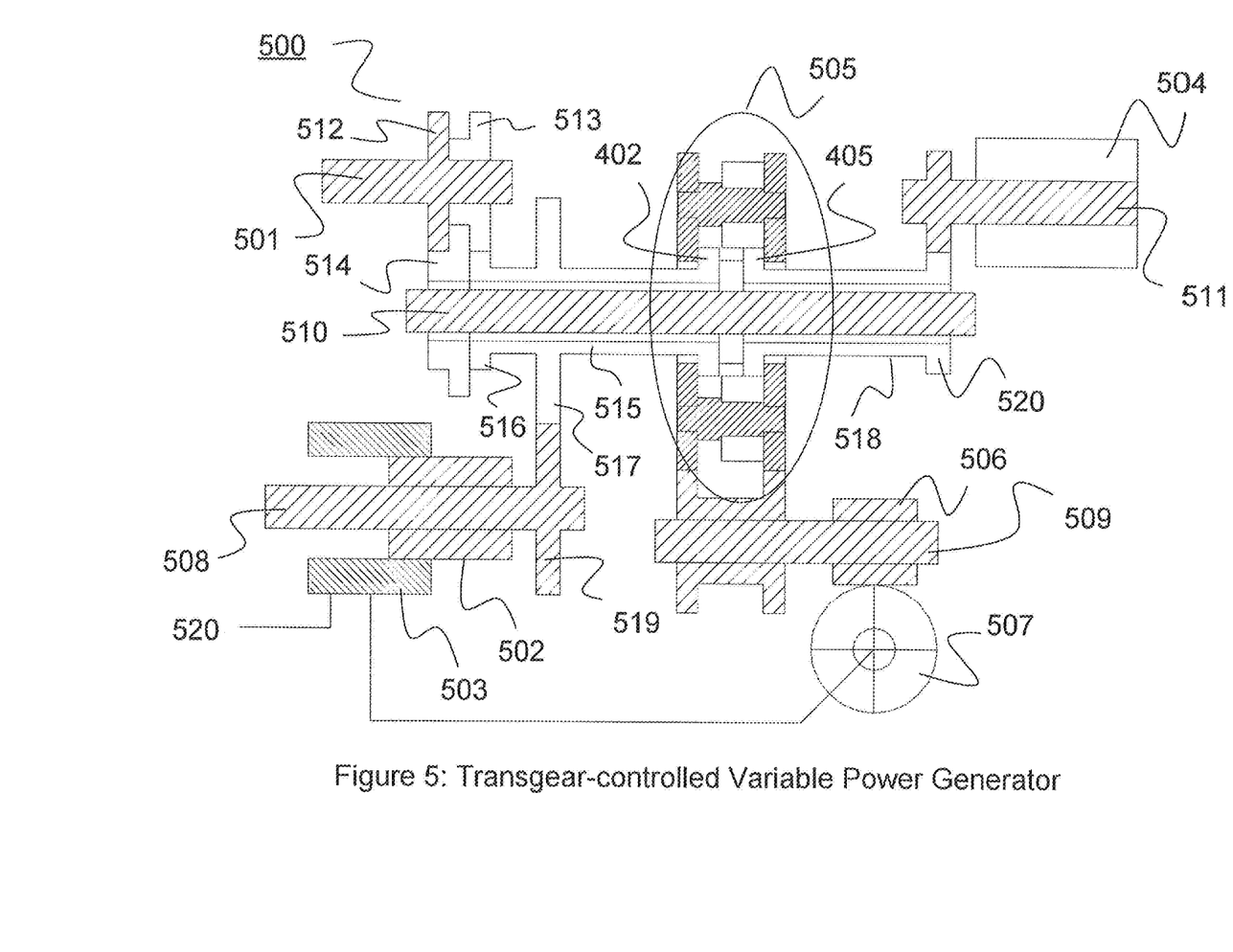
FIG. 5 shows a diagram of a Transgear™ gear assembly-controlled variable power generator (VPG) 500 with the rotor 502 of the VPG integral to or attached to output shaft 508 shown displaced from the stator 503 by way of example.

Referring to FIG. 5, there is shown a three variable spur/helical Transgear™ gear assembly 505 providing control of a variable power generator comprising output shaft 508, rotor 502 and stator 503. Input to input shaft 501 is rotating VPG output shaft 508 via gear box controlled shaft 510 and under control of Transgear assembly 505 and constant speed motor 504. Left sun gear 402 of Transgear 505 is connected to first sleeve 515 having gear 517 meshed with generator output shaft 508 via meshed gear 519. The rotational speed of input shaft 501 is increased and reflected in the rotational velocity of shaft 510 via the gear box, for example, comprising gears 514 and 513. Motor 504 preferably rotates at a constant speed and the motor shaft 511 is rotating right sun gear 405 of Transgear assembly 505 via second sleeve 518 and gear 520 integral with or attached to sleeve 518. The variation of left sun gear 402 of Transgear assembly 505 will adjust the stator 503 displacement with respect to rotor 502 through, for example, worm 506 and worm gear 507. Input shaft 501 rotational velocity may be variable and output shaft 508 rotational velocity held constant via control motor 504 input to Transgear assembly 505.

Figure 6A:
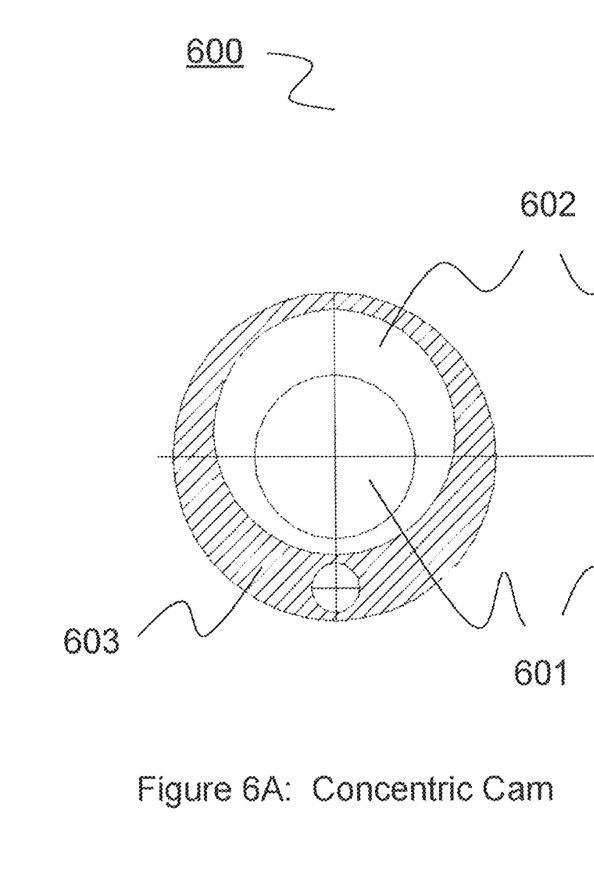
FIGS. 6A and 6B show a concentric cam and an eccentric cam comprising a central shaft 601, inner cam 602, and an outer cam 603. Further details of the eccentric cam and its use in a driver and cam-controlled speed converter are provided in FIGS. 7, 9 and 10 of U.S. Pat. Nos. 8,641,570 and 9,017,208 of Kyung Soo Han.
Figure 6B:
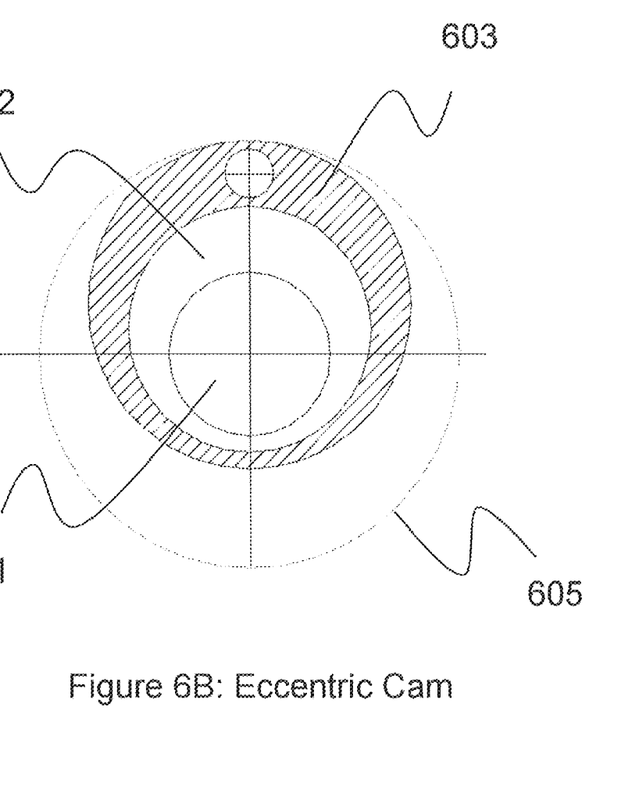
Figure 7A:
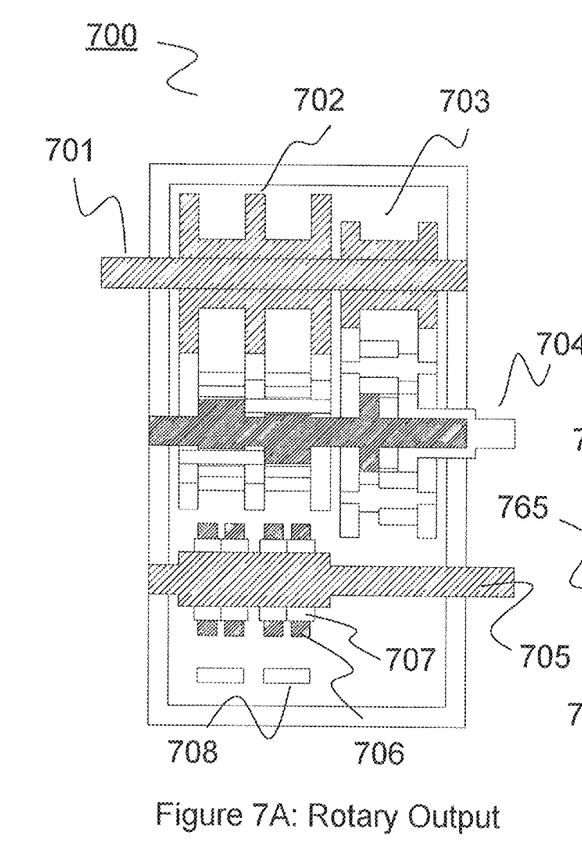
FIG. 7A shows rotary output 705 versus FIG. 7B electrical output, for example, by producing reciprocating output 765 and generating electrical output by VPG 757/758.
Figure 7B:
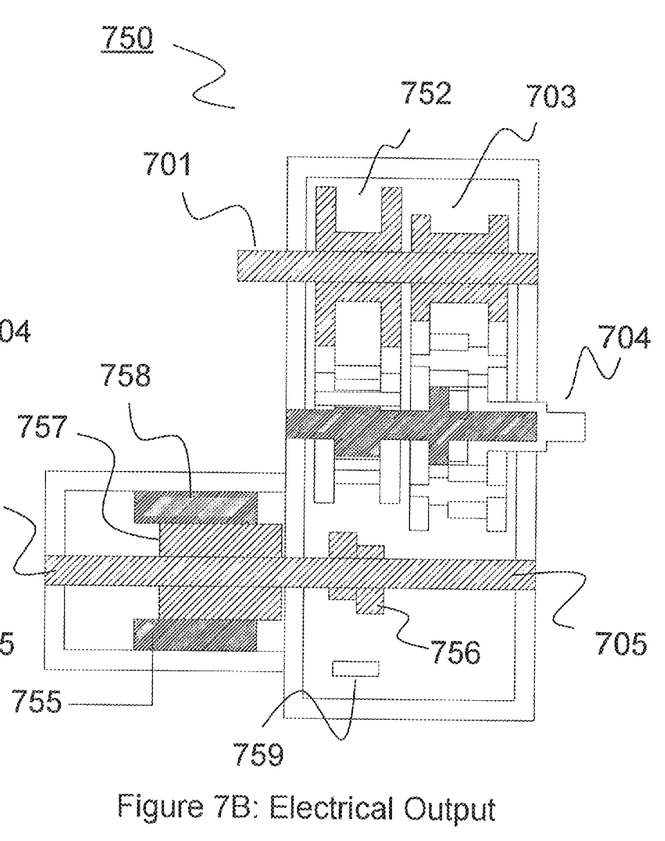

Also, referring to FIG. 7A and FIG. 7B, FIG. 7A is a variable pitch cam controlled speed converter with rotational output 705 which is described in the priority patent application and U.S. Pat. Nos. 8,641,570 and 9,017,208, and FIG. 7B is a variable pitch cam controlled speed converter with a VPG producing electrical output 755. There is shown a VPG comprising a shaft 765 which may be an extension of shaft 705, rotor 757 and stator 758 displaceable with respect to rotor 757, for regulating reciprocating shaft 765 produced by gears 756 attached to shaft 765 and driven by driver 759 including an eccentric cam (FIGS. 6A and 6B). Further details of a cam-controlled speed converter of FIG. 7A are described in connection with the description of FIG. 10 of U.S. Pat. No. 8,641,570 issued Feb. 4, 2014 and U.S. Pat. No. 9,017,208 issued Apr. 28, 2015.

Figure 8A:
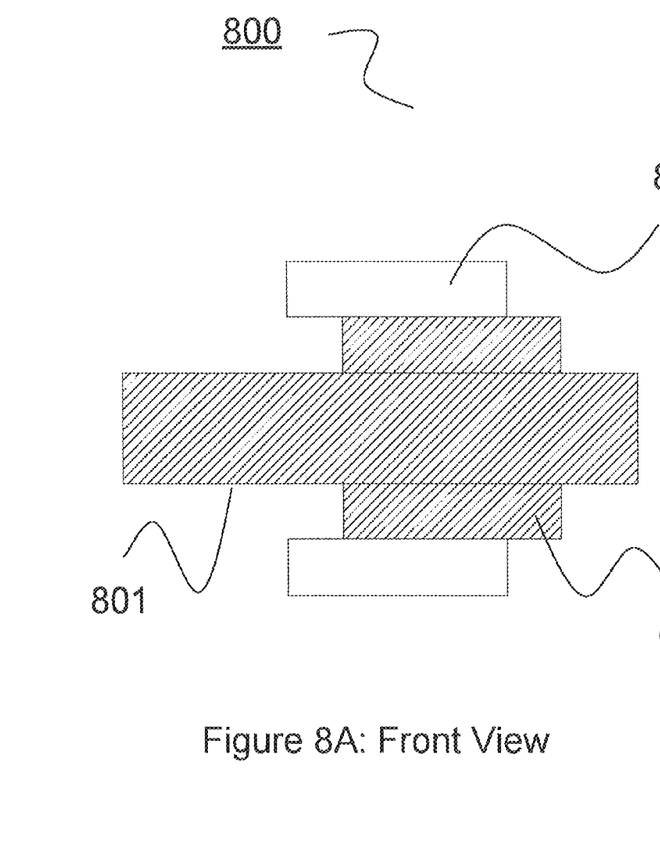
FIG. 8A, front view, and FIG. 8B, side view, show an example in cross-sectional view of how to achieve synchronization with a VPG (FIG. 8A) by adjusting the angle of displacement of stator 803 with respect to a rotor 802 (adjustment angle 804) so as to better achieve synchronization between a wind or water flow input with a desired synchronized phase angle of power output to a power grid.
Figure 8B:
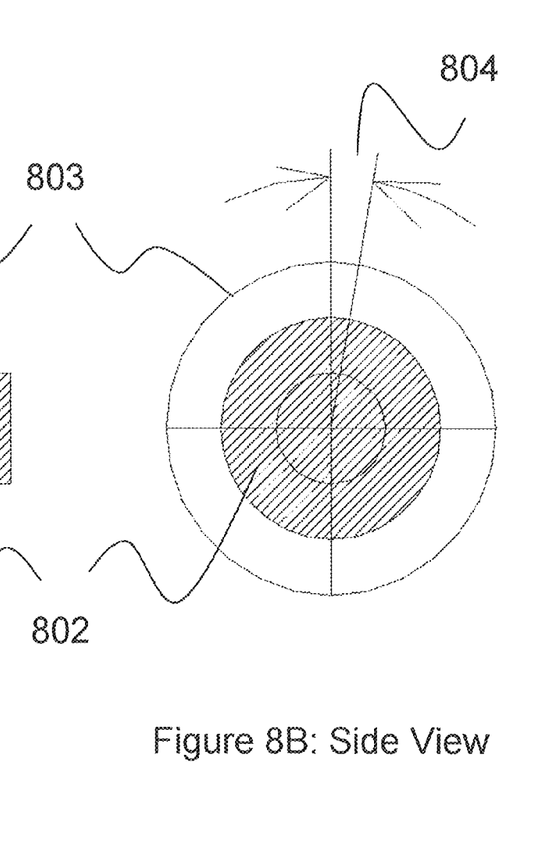

The synchronization of rotor and stator of a VPG may be out of synch as seen in FIG. 8B by an angle 804. The angle may be adjusted by radially moving rotor 802 with respect to rotor 803.

Figure 9:
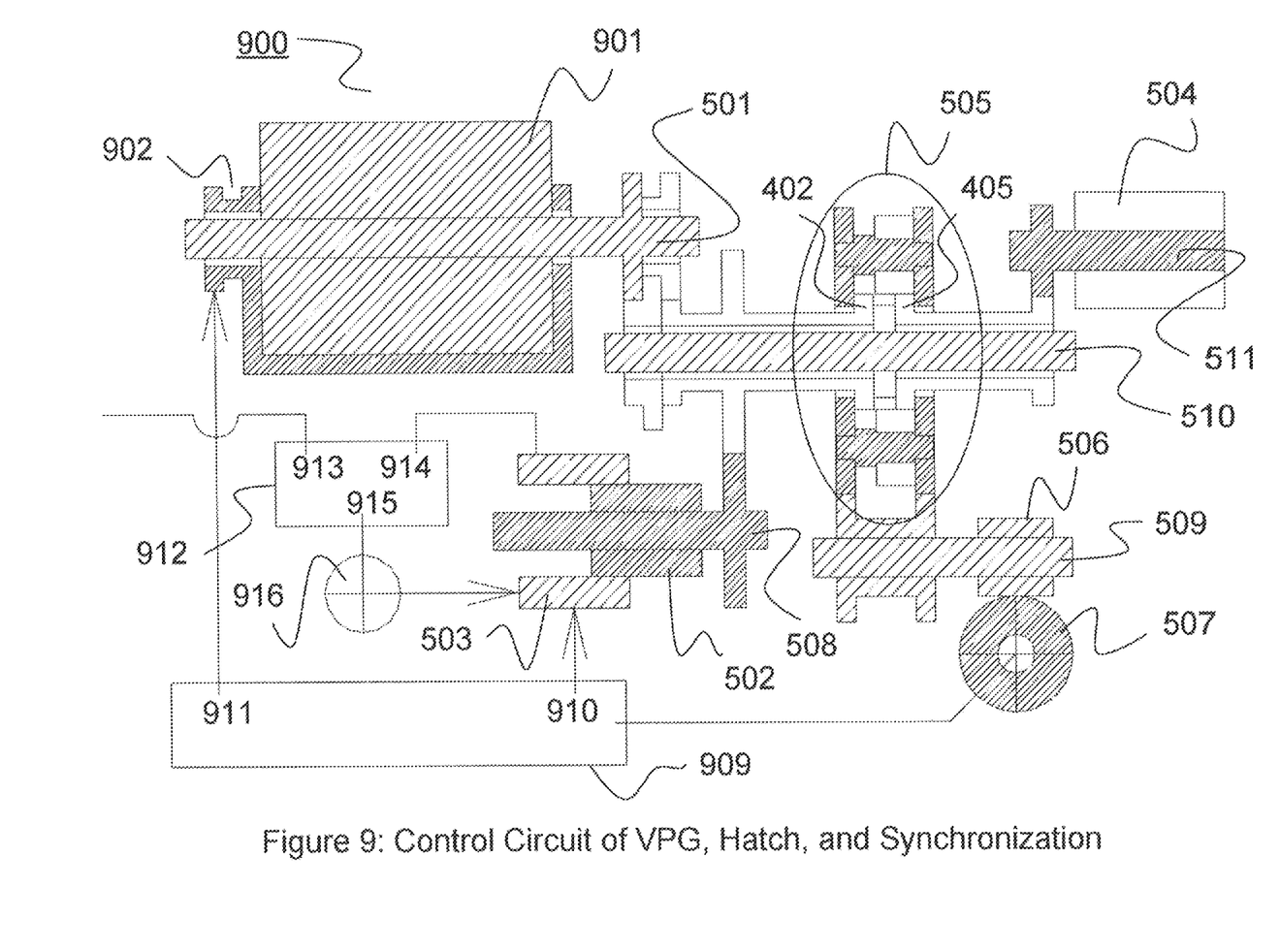
FIG. 9 shows a control schematic of a DDMotion River/tidal/ocean wave/ocean current Turbine (also known as a Marine Hydrokinetic (MHK) turbine). A run-of-river turbine also known as an MHK turbine is described in U.S. patent application Ser. No. 14/255,377 of Kyung Soo Han filed Apr. 17, 2014, now allowed.
Figure 10:
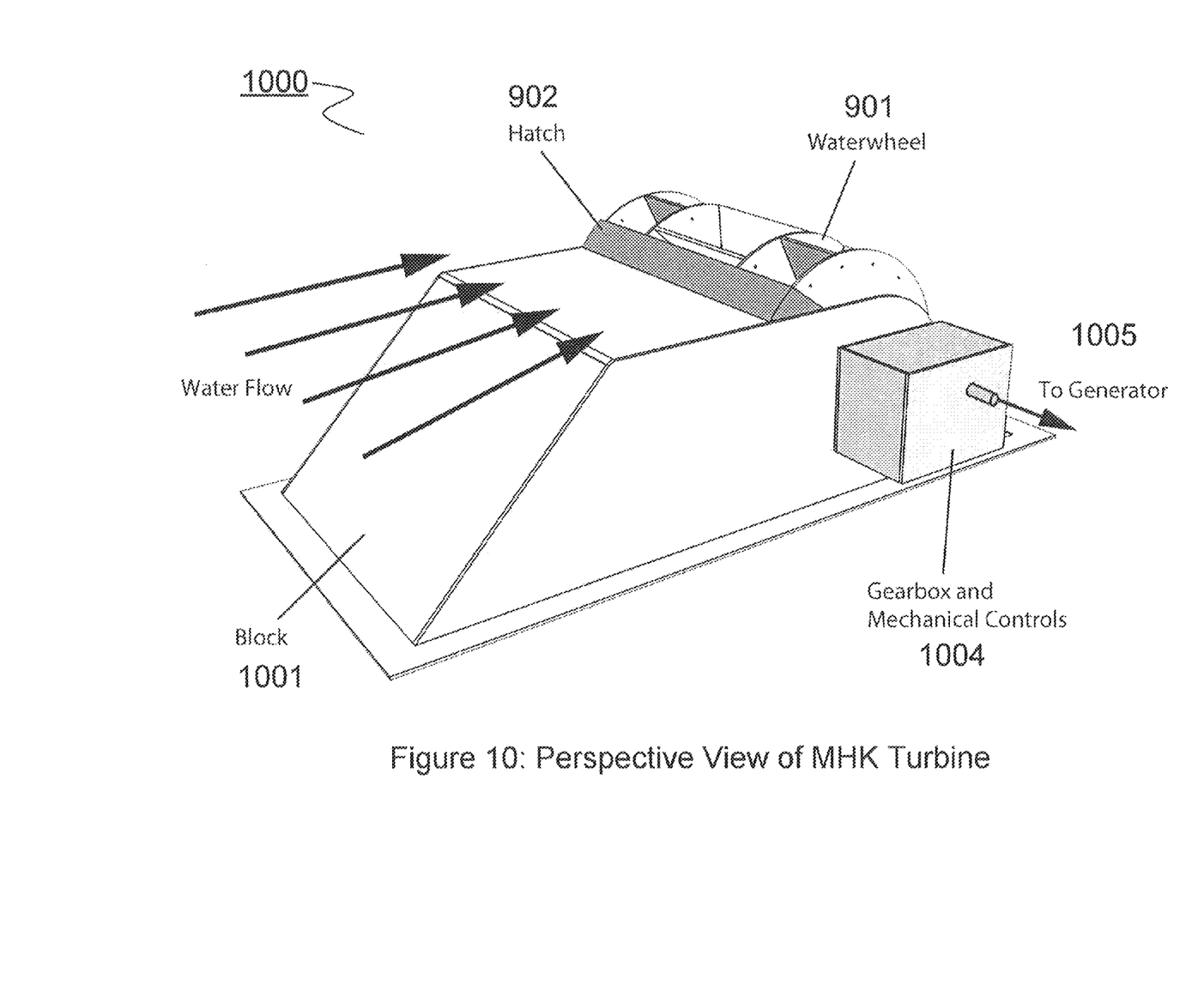
FIG. 10 provides a corresponding perspective view of an MHK turbine, for example, located so as to receive water flow and generate electricity.

FIGS. 9 and 10 are provided by way of example to show the application of a VPG/Hatch in an MHK turbine, for example, for control of output speed or electric current frequency to be relatively constant in comparison to variable water flow rates. The same principles may be applied to wind turbines to obtain constant output rotational velocity or electric current frequency in comparison to variable wind velocities.

These and other embodiments will be described with respect to the drawings, a brief description of which follows.

BRIEF DESCRIPTION OF THE DRAWINGS

FIGS. 2A, 2B and 2C provide an overview mechanical diagram of a Variable Torque Generator (VTG) also called a variable power generator or VPG.

FIG. 4A shows a left side view, FIG. 4B shows a front view and FIG. 4C shows a right side view of a three variable basic spur or helical Transgear™ gear assembly useful in FIG. 5. This three variable embodiment is discussed in pending U.S. patent application Ser. No. 14/668,315, of Kyung Soo Han filed Mar. 25, 2015. The spur gear assembly is also shown as FIG. 1 in U.S. Pat. No. 8,986,149.

FIGS. 7A and 7B show two versions of a speed converter. FIG. 7A is described in the priority patent applications and patents.

FIGS. 9 and 10 further show how to combine details of MHK turbine electric power generator control following principles introduced with reference to FIGS. 3, 5, and 7. In FIG. 9, three forms of MHK control are shown: The first form of control is stator 904 control of a VPG. The second form of control is Hatch 902 control of Hatch 902 and waterwheel 901. The third form of control is synchronizing control of rotor 903 and stator 904 of VPG.

The principles of application of a VPG for controlling input with respect to output will now be further described in the detailed description of the drawings which follows.

DETAILED DESCRIPTION

In all the figures of the present embodiments of the invention, the first reference number such as 1XX indicates figure number where the element first appears. Now referring to FIG. 1, there is shown the basic concept of a variable torque generator (VTG) or variable power generator (VPG) useful in all embodiments for controlling torque from a maximum to a minimum over a continuous range. For steady flowing streams (or steady wind conditions), without much flow rate variation, a constant speed output can be easily produced by compensating the input. As shown in FIG. 1, a constant speed, variable torque generator (VTG) or variable power generator (VPG) in electric power generation applications 100, comprises rotor shaft 101 which is shown displaced axially with integral rotor 102 to a position of minimum overlap with stator 103. Either stator 103 may be moved to overlap rotor 102 or rotor 102 may be moved to overlap stator 103 in alternative embodiments. In the present embodiment in the following figures, for example, the stator may be moved (due to a simpler presentation) to a maximum power generation position by moving the stator from left to right to be contained within rotor 102. This embodiment was verified by the University of Maryland, Baltimore County to provide control of a variable rotational input velocity to match a constant output rotational shaft velocity, for example, by using a servo motor, for example, to move stator from maximum displacement (for example, high winds or extreme water flows) to minimum displacement (perfect overlapping) (for example, low winds or slow speed water flow).

The principles of a VPG will now be discussed with reference to FIG. 2A (a fixed overlap of rotor 202 and stator 203 forms a fixed overlap power generator 200 housed in a housing with rotating shaft 201 extending from the housing. A variable power generator 250 having a slightly larger housing is shown in minimum overlap 260 (FIG. 2B) and maximum overlap 261 (FIG. 2C), for example, by sliding stator 253 axially and controlled to an infinite number of positions by a motor (not shown) if the rotor 252 is not to move with the shaft 201 as shown. The output 255 of movable stator 253 may be connected to a variable transformer or other device or wind or MHK turbine discussed above having various shafts, wind/water input shafts, control shafts and output shafts. Note that in an alternative embodiment, a rotor 252 may be moveable axially with respect to the stator 253 if needed to achieve minimum, medium and maximum torque (or any position in between). The moveable rotor 252 or stator 253 may be moved axially with respect to one another to achieve anywhere from a minimum to a maximum overlap by a motor and controlled to a value responsive to, for example, a high or low wind or river velocity by a wind/river flow sensor, an input shaft sensor or other shaft sensor (velocity or torque, for example). For example, as described above, a value may be stored in memory of a microprocessor based control associated with a minimum torque value (or velocity) or a maximum torque value (or velocity) for a given system and the variable torque/power generator controlled by the motor to match whether a minimum fluid (wind or water) velocity or maximum fluid velocity (or a velocity in between minimum and maximum) is currently being experienced by the wind or river turbine system. These variable torque/power generators may be added to an input compensating IVMC (infinitely variable motion control) device of any kind with a speed converter (or output shaft), for example, to convert output electric power to a grid at grid frequency (for example, 60 Hz or 50 Hz).

Four (4) independent concepts are described herein, but they are all related to variable overlap of rotor and stator assemblies and the application of these in a variable torque/power generator (VTG/VPG). The four independent concepts described herein comprise: (a) Extension of the VPG concept to motors (VPM): the extension comprising adjustment of the relative axial overlap between the rotor and stator to control speed and torque in, for example, a vehicle engine output independently (FIGS. 7A and 7B). The VPG extension may seem to be a good application for electric vehicles (EV's) (in electrical power generators used with the motors and the motors themselves): Elon Musk of Tesla or other manufacturers of electric vehicles using constant sources of power such as battery power may appreciate this suggestion of the use of variable output power generators. An internal combustion engine (actually a plurality of engine embodiments) in which the present concept may be applied to advantage is disclosed in pending U.S. application Ser. No. 14/225,658, filed Mar. 26, 2014, now allowed (and published as U.S. Published Patent Application 2014/02960616 on Oct. 2, 2014).

A second concept is for (b) mechanical synchronization between a rotor and a stator; discussed herein will be an adjustment of the relatively small angular relationship between the rotor and stator (per FIGS. 8A and 8B). This concept of rotating one moveable element in cross-section about the immovable element (the stator) can be useful for synchronizing the lead/lag relationship between the rotor and stator in operation. For example, the regulation of adjustment angle 804 is useful for mechanical speed converters.

A third concept discussed herein is (c) providing a reciprocating input to a variable power generator generating electricity with a reciprocating rotor (per FIG. 7B). This concept eliminates the need of Sprags from our speed converter, and reduces cost, weight, size, and potential validation time.

A fourth concept described herein is (d) Reactive VPG with respect to a waterwheel and generator used in wind or marine hydrokinetic (MHK) turbines—VPG may control torque to the waterwheel in our river or wind turbine (or any variable load); see FIGS. 3, 5, 7, and 9. A river turbine with a Hatch is described in priority U.S. Pat. No. 8,485,933 and further embodiments of a river turbine with Hatch control are disclosed in pending U.S. application Ser. No. 14/225,658 filed Mar. 26, 2014, now allowed (and published as U.S. Published Patent Application 2014/02960616 on Oct. 2, 2014). A wind turbine and VTG (FIG. 8) are also described in U.S. Pat. No. 8,388,481 and WO 2011/011358 of Mr. Han. Reactive torque control may, for example, control waterwheel speed up to a designed maximum and then Hatch control may be used to control waterwheel speed.

The second concept (mechanical synchronization) is a cousin to VPG since the relative relationship between the rotor and stator are being adjusted except one is linearly (axially) and the other angularly (radially) (as seen in cross sectional view FIG. 8B).

Extended Applications of VTG: VTM and Reactive Feedback Control

Variable Torque Generator (VTG) or Variable Power Generator (VPG)

Previously, U.S. Pat. Nos. 8,388,481 and 8,485,933 issued to Kyung Soo Han and a research paper, Development of a Variable Electromotive-Force Generator for a Wind Turbine, 7 pages, authored by W. D. Zhu et al., ASME 2012 International Mechanical Engineering Congress and Exposition, published November 9-15, via the University of Maryland Baltimore County (under Maryland Industrial Partnerships, MIPs, Grant) for VTG for Mr. Han and its applications described as a generator incorporated herein by reference as to their entire contents.

Referring to FIG. 1, FIG. 2B and FIG. 2C, the disclosed VTG/VPG device and generator is capable of infinitely varying the required rotor torque by adjusting the relative overlap between the rotor and stator, one of which is associated with a shaft. A VTG/VPG can control torque independently of other controls. According to a concept of an embodiment of the present invention, generator torque controls for wind and MHK turbines may be controlled via VTG/VPG. Advantages include: the cut-in speed can be reduced close to zero and harness lower speed energy and rated speed can be increased to close to cut-out speed (the rated power of a generator can be increased when the rated speed increases). The VTG/VPG of FIG. 2B, 2C may be applied in an electric vehicle or an internal combustion engine as described in pending U.S. patent application Ser. No. 14/225,658 filed Mar. 26, 2014, now allowed (and published as U.S. Published Patent Application 2014/02960616 on Oct. 2, 2014).

Variable Torque Motor (VTM) or Variable Power Motor

The speed and torque of currently used variable speed motors can be varied with variable voltage/current, but they may be varied together in a fixed overlap relationship but each one may not be controlled independently. On the other hand, by adjusting the relative overlap between the rotor and stator the torque also can be controlled independently per FIGS. 2B and 2C.

Typical applications of use of VTG/VPG in this concept include Electric vehicle EV transmissions, generators and motors (for controlling speed and torque) and refrigerator and air-conditioner compressor controls (for controlling temperature). Advantages of use in any electric vehicle include: More miles to drive per battery charge, improved performance (better speed and torque control). Variation of synchronization of rotor with respect to stator by an adjustment angle applied to one or the other is shown in FIGS. 8A and 8B.

Reactive Power Control by Variable Torque Generator (VTG), Variable Power Generator Previously U.S. Pat. Nos. 8,388,481 and 8,485,933 issued to Kyung Soo Han and the above-referenced research paper were published by University of Maryland, Baltimore County (a grant from Maryland Industrial Partnerships, MIPS) for VTG for Mr. Han and its applications described as a generator. VTG as a generator is capable of infinitely varying the required rotor torque by adjusting the relative overlap between the rotor and stator as described above with reference to FIGS. 1, 2B and 2C. The VTG/VPG may match the output of the generator to the given input torque.

A feedback control system is a reactive control system by adjusting the VTG/VPG torque/rpm/power, the adjusted VTG/VPG torque/rpm/power transfers to the rotor, and the rotor speed will be adjusted accordingly (for example, waterwheel speed in a river/tidal/ocean current or MHK turbine). Typical Applications include and are not limited to wind turbines and MHK turbines as described above and disclosed in the issued patents and pending application described above. Advantages of such a reactive power control include: The cut-in speed can be reduced close to zero, the rated speed can be increased to close to cut-out speed, and the increased rated speed increases the rated power of the output, for example, FIGS. 5, 7, and 9. The Hatch 902 may be controlled to limit or increase the flow of water to the waterwheel 901 and so the waterwheel speed.

A feedback control system being a reactive control system may be applied first, before Hatch control occurs, between the waterwheel shaft and the generator shaft output to be a reactive system to the flow of water via the Hatch. In a weak river flow situation, the VTG/VPG may be in a minimum torque position so that the output of the generator may be as great as possible, that is, the generator output shaft will require minimum torque to turn. As the water flow increases, it is desirable that the generator output be at maximum torque in reaction to an increased water flow and increased ability to turn the generator output shaft at, for example, 60 Hertz to feed a power grid.

Figure 3:
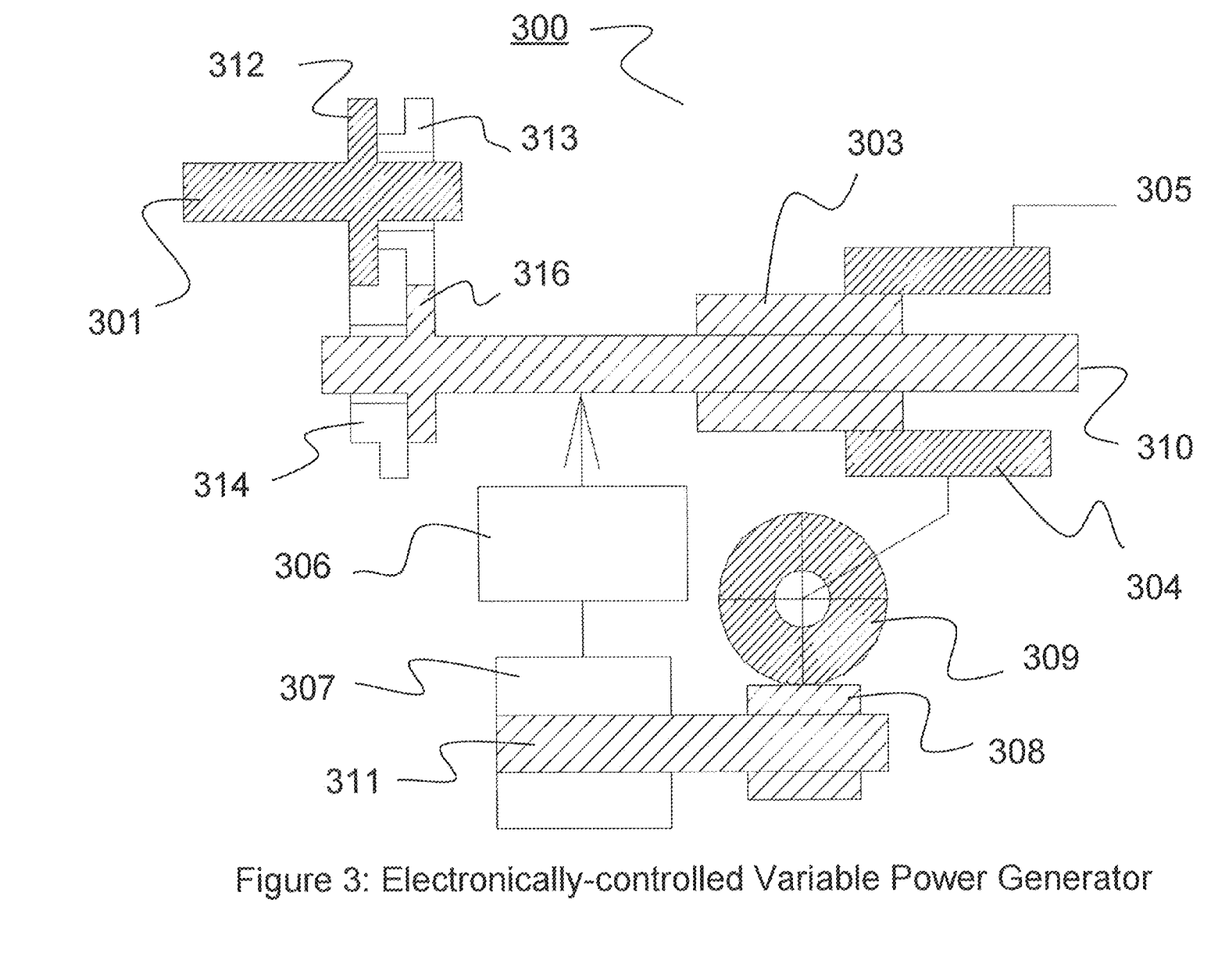
FIG. 3 provides an overall schematic and mechanical diagram of an electronically-controlled variable power generator 300 for use, for example, in a wind or MHK turbine for controlling variable input flow rates to achieve a constant output rotational velocity or electric current frequency.
Figures 4A, 4B, 4C:
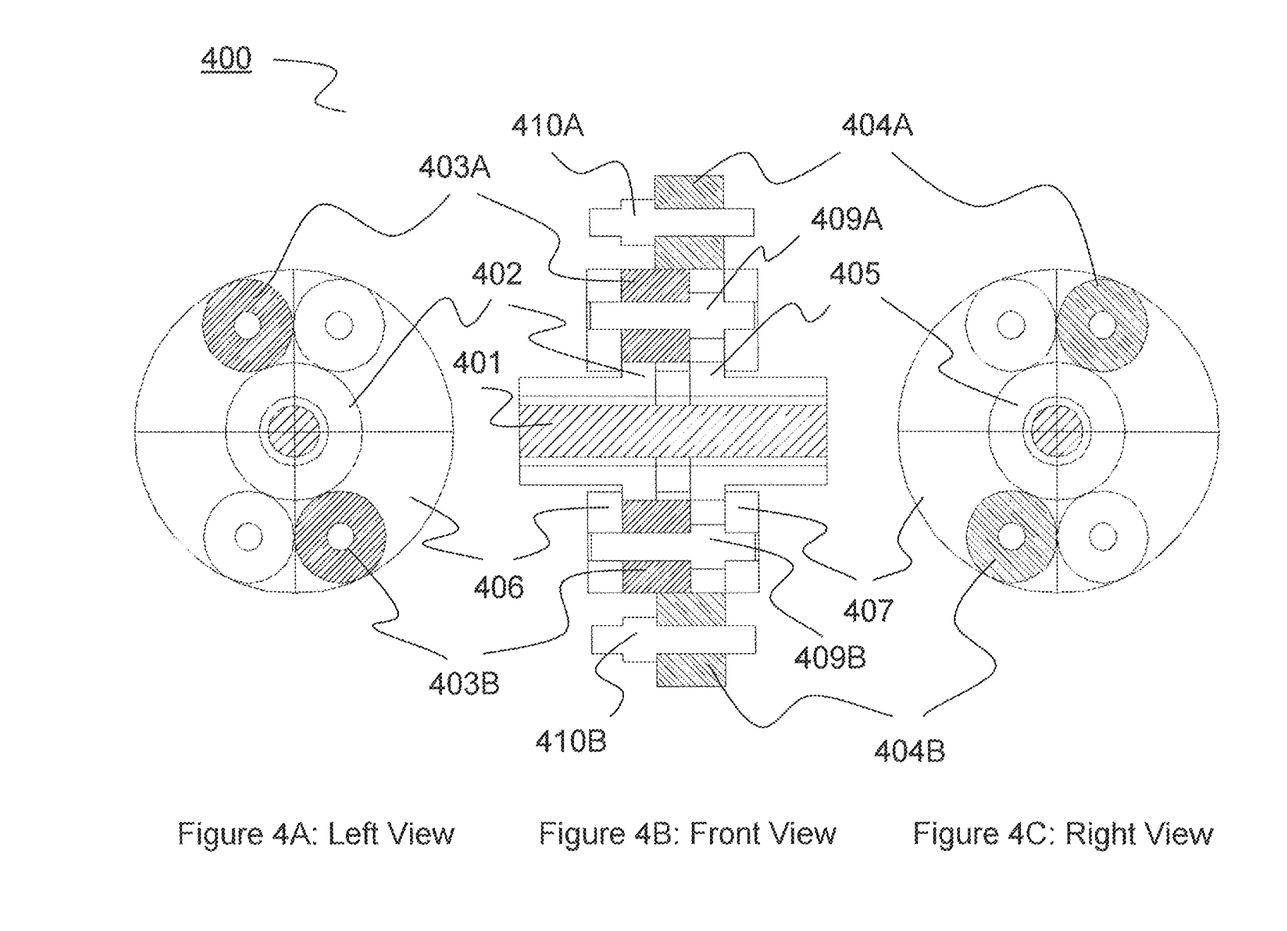

Referring now to FIG. 3, there is shown the MHK turbine of FIG. 10 as MHK turbine 300 with an exemplary control system shown in some detail using a VPG 310, 303, 304 and 305. MHK turbine 300 receives water flow and the rpm of waterwheel shaft 301 will be increased by a gearbox. Starting at upper left, shaft 301 turns gear 312 which meshed with gear 314 of an exemplary gear box. The gearbox may contain more or fewer gears than shown (for example, two gears 313, 314 or more) and the gears meshed to increase or decrease rotational velocity between shaft 301 and shaft 310 (preferably increase rpm of shaft 310). Gear 314 meshes with gear 313 of the gearbox, and gear 313 meshes with gear 316 integral with or attached to shaft 310. Gearbox output shaft 310 rotates VPG rotor 303 and the rpm of shaft 310/rotor 303 is controlled by sensing the shaft speed as determined by a sensor in control box 306, in this example, sensing the output shaft 310 rotational velocity as driven by the waterwheel shaft 301 through the gearbox (for example, gears 312, 314, 313 and 316). Measured rpm at control box 306 will decide to actuate servo motor 307 and the motor output may adjust stator 304 axially through a pair of worm 308 and worm gear 309 or other choice of gears as is known in the art. In accordance with an embodiment of the present invention, the sensor of rotational velocity, for example, a tachometer, in control box 306 (preferably a special purpose program controlled microprocessor and memory and speed sensor) may also provide a stator 304 control output of waterwheel shaft speed via stator control motor 307, for example, a servo motor, (which may be rotor control alternately) to move a rotor/stator (303, 304) between a completely overlapping or maximum overlap position and a minimum overlap position with respect to each other. Power generated 305 is for outputting power to a grid at preferably constant frequency, for example, 60 Hz in the US and 50 Hz in Europe. This invention embodiment is equally applicable to regulating a wind turbine power generation to a grid.

FIGS. 9 and 10 further show how to combine details of MHK turbine electric power generator control following principles introduced with reference to FIGS. 3, 5, and 7. An MHK turbine system 900 of FIG. 9, by way of example, may have similar control applied in a wind turbine or other renewable source setting to match input rotational velocity to output power grid. Three forms of MHK control are shown: The first form of control is stator 503 control of a VPG. The second form of control is Hatch 902 control of Hatch 902 and waterwheel 901. The third form of control is synchronizing control of rotor 503 and stator 502 of a VPG. Each form of control will be explained separately. First the VPG control will be explained briefly. Input to waterwheel shaft 501 splits into two after increasing the rpm with a gearbox (numbered individually, not numbered as a unit): one to VPG shaft 508 and the other to left sun gear 402 of Transgear assembly 505. A constant speed motor 504 input will be driving right sun gear 405 of Transgear assembly 505. The difference in rpm will be the output (carrier) and the output will be delivered to shaft 509. Worm 506 is attached to shaft 509 and meshed with worm gear 507. Worm gear 507 is connected to control box 909. Control boxes 909 and 912 may be special purpose, program controlled processors, for example, microprocessors and memory for storing programs and values of measured parameters and desired values. Control box output 910 adjusts stator 503. Control box output 911 adjusts Hatch 902 axially. Control box 912 is synchronizing the harnessed electricity to the grid power. There are two inputs to control box 912: one from the grid 913 and the other from stator 914. When they need to be synchronized, a servo motor may adjust the stator radially.

FIG. 10 provides a better view of how an MHK turbine may be placed at a river or stream or ocean. As shown in recently allowed patent application, a run-of-river turbine also known as an MHK turbine is described in U.S. patent application Ser. No. 14/255,377 of Kyung Soo Han filed Apr. 17, 2014, now allowed. The MHK turbine may be allowed to rotate with tidal flow so as to always face the direction of tidal flow. A ramp called ramp block 1001 receives water flow and the water flow may be channeled over a horizontal plane to hatch 902 shown in a mostly open position to allow the water flow to turn waterwheel 901. A gear box and controls 1004 (which may comprise a special purpose programmed controlled processor) regulates the variable rotational velocity of waterwheel 901 to a desired constant rotational velocity of output shaft 1005 for driving an electric generator for feeding power to a power grid (not shown). As described, this MHK turbine may be controlled in the manner described with reference to FIG. 9.

(b). Synchronization

1. Synchronization

Invention: This invention is applicable, for example, to power generators with constant input to a rotor. Since the rotor speed is constant, the frequency is assumed to be constant. If the frequency of generator and the power grid is out of phase, we may adjust the relative angular positions between the rotor and stator using a spur/helical gear or other Transgear gear assembly (for example, bevel gear, ring gear, N assignable variables where N is greater than or equal to 3) or other control to match the phase angle that the input and output frequencies are out of phase with one another (for example, referring to FIG. 8B, the rotor 802 may lead or lag the stator 803 by an angle 804 that may be compensated via adjusting angle 804 by moving the displacement of the rotor 802 radially with reference to the stator 803). Mechanical synchronization of the rotor 802 with the stator 803 is achieved by continuously measuring the phase angle 804 of the output versus the input and matching it continuously by controlling the adjustment angle 804 by moving the rotor with reference to the stator or vice versa.

2. Synchronization Techniques

The problem is formulated with respect to a wind turbine but may be applicable to MHK turbines and to how to synchronize a wind farm with a power grid. One answer may be found at: https://answers.yahoo.com/question/index?qid=20100305065433AAyR1Mp Question: How does one interconnect a wind farm with a power grid, how does one synchronize this connection so as to achieve a constant 60 Hz (or 50 Hz, European) output of power, or may any simulation in MATLAB demonstrate the synchronization impact?

Best Answer: The earliest wind generators were synchronous machines—NASA Mod-1 for example. These had to be synchronized by feathering the blades to control rotational speed. This technology was interesting, but not very practical, and blade pitch rotation is rarely used today.

A solution to synchronization is shown in FIGS. 8A and 8B wherein it is shown that an adjustment angle 804 is provided in cross-sectional view whereby a small adjustment angle 804 is provided for the stator 803 with respect to the rotor 802 (if one leads or lags the other) that may be controlled to assist in synchronization of input and output frequency. The advantage of the small synchronization adjustment angle 804 is that such adjustment may cause phase angle matching of the stator with respect to the rotor to overcome the phase angle difference of one element, the rotor, with respect to the stator, at times of little wind or river flow activity versus heavy wind or river velocity and particularly when the phase angle variation is very small so that the automatic compensating movement of the adjustment angle 804 may be small.

Some wind machines are asynchronous. This means induction machines that operate slightly above synchronous speed. These do not require synchronization. Some wind machines are full-conversion DC machines. The generators produce DC which then goes through a DC to AC converter to become AC. These also generally do not require synchronization.

Some wind machines are doubly-fed induction machines in Which the machine synchronizes itself That is, the rotor is excited at a frequency that is related to the difference between system frequency and the rotating speed of the machine. This frequency is determined automatically, and provides inherent synchronization.

Other Answers (1)

Wind farm generators are Asynchronous generators, or Induction generators. These are just cage induction motors that are driven slightly above synchronous speed. Under these conditions, the motor becomes a generator and, as it was connected to the supply when it was motoring, so separate synchronization is typically necessary.

Question: Which type of electrical generators is best to be used in wind turbines? See http://www.researchgate.net/post/Which_type_of_electrical_generator_is_best_to_be_used_in_wind_turbines?

Ashish Shrivastava Hindustan•Aeronautics Limited

If we analyze the commercially available wind turbine generators, it is found that direct drive, grid-connected generators indicate a future trend in the wind generation of power. The system reliability will increase by elimination of the gear boxes and the power electronic converters. Also the system efficiency will increase because the losses in the gear box and power electronic converters are eliminated.

Permanent Magnet Synchronous Generator (PMSG). Field excited synchronous generator (FESG) and the Induction Generator (IG) are three candidates for such applications. As permanent magnet excitation eliminates the excitation losses of a FESG, hence, PMSG will be a more favored option going forward. The direct drive, grid connected IG and PMSG generators are intended for fixed speed operations. When the PMSG generator is connected to the grid, the speed is determined by the grid frequency and is constant. So, if the torque to the generator is increased (sudden blow of wind), the generator will produce electromagnetic force to resist an increase in speed. Therefore, a blow of wind leads to large stresses on the wind turbine's drive train. However IG allows a small change of speed with the change of torque going to the generator and lower stresses/tear and wear of the drive train. As the IG and the PMSG machine have similar a Stator component, the cost difference is mainly due to the rotor. The PM's cost is always going to be more than that of aluminum, and one can see that the cost of the induction generator is expected to be much lower than the PMSG generators for the same power rating. But PMSG generators have higher efficiency so the higher material cost may he somewhat compensated for the extra electricity generated. Also, inductive power factor of the induction generators require capacitors for power factor correction and may increases the overall cost of the IG. So, a trade-off analysis is needed for case by case basis before declaring any one machine best for an application or an Installation.

In any wind turbine embodiment, a shared characteristic is that the output generator requires regulation with respect to wind speed and so the embodiment of FIG. 3 (absent the hatch control) of FIG. 3 for synchronization of phase may be applied to control the wind turbine generator output via VPG by sensing the wind turbine propeller shaft speed and governing the torque and phase angle applied between generator rotor and stator by the principles of FIGS. 8A and 8B.

(c). Generator with Reciprocating Rotor

1. Cam Driven Speed Converter with Sprags

Prior Art: US patents have issued to DDMotion for cam driven speed converters. A speed converter controls the given input to a required output. Commonly known speed converters are transmission for vehicles. A wind turbine has a power converter (or variable frequency converter) and the power converter converts harnessed variable power by rotor to grid compatible constant frequency power—a constant desired output. A speed converter converts (mechanical) rotational power (torque and rotational speed), (frequency is constant when the rotational speed is constant) and power converter converts the mechanical input propeller shaft velocity to electrical power (voltage, current, and frequency).

Typical Applications: Wind Turbines, MHK Turbines

Advantages: harnessing grid compatible constant electricity without power grooming (no heat, no power loss, less failures, economical), durable, scalable, generate more electricity by lowering the cut-in speed, increasing the rated speed (rated power), eco/fish friendly, and protect the system from floating debris.

2. Cam Driven Speed Converter without Sprags

Cam driven speed converters may have Sprags to convert reciprocating input to continuously rotating output. The use of Sprags may be familiar with the automotive industry since they are used in automatic transmissions. The cam driven speed converters (variable pitch cam shown in FIG. 6, concentric cam FIG. 6A and eccentric cam FIG. 6B, and applications of variable pitch cams shown in FIG. 7, speed converters of FIG. 7A rotary output with Sprags and 7B electrical output by generating electricity with reciprocating rotor) may be used to convert rotary energy to rotary energy or electricity. When a speed converter is converting rotary energy to electrical energy, the cost of a speed converter can be reduced: the reciprocating output of a cam driven speed converter can be connected and a generator with a reciprocating rotor can generate grid compatible electricity. The generator can be a conventional fixed overlap generator or VPG.

Referring to FIGS. 6A and 6B, there are shown in FIGS. 6A and 6B, a cam that may be converted from a concentric cam to an eccentric cam enlarging its effective cam profile. The concentric cam/eccentric cam is also found in recently issued U.S. Pat. No. 9,017,208 to Kyung Han as FIG. 7, cam controlled infinitely variable motion control (IVMC). To convert a constant speed input to an infinitely variable output, an infinitely variable speed converter is needed. A cam controlled IVMC converts a constant input speed into sinusoidal waveforms using a variable pitch cam per FIGS. 6A and 6B, rectifies half waves and superimposes all the rectified sinusoidal waveforms into an output. The building blocks necessary for the IVMC system will now be described.

As shown in FIGS. 6A and 6B, a variable pitch cam assembly 600 comprises an eccentric inner cam surrounding a shaft and an eccentric outer cam assembled to freely move around the eccentric inner cam. Both inner cam and outer cam form perfectly round circles except that they are bored eccentrically. Outer cam may freely rotate around inner cam to form minimum eccentric cam profile per FIG. 6A and maximum eccentric cam profile per FIG. 6B. These cams with an infinitely variable control can produce infinitely variable eccentricity from a minimum effective cam profile of FIG. 6A where the outer cam is concentric with respect to the center of cam shaft 601 per FIG. 6A to a maximum effective cam profile per FIG. 6B where the outer cam is eccentric relative to the center of cam shaft 601. Since both inner and outer cams are mounted on and around the input cam shaft 601, producing the parts for variable pitch cam 600 is simple, and the design can handle higher torque compared, for example, to a crankshaft with an offset shaft.

Referring now to FIGS. 7A and 7B, two speed converters are shown. In FIG. 7A, the output shaft 705 is delivering rotary output with output gears 706 imbedded with Sprags 707 wherein FIG. 7B shows a speed converter having output gears 756 without Sprags 707 and a VPG is attached to the output shaft 705/765, rotor 757 and stator 758. Shaft 705 is extended in FIG. 7B to comprise shaft extension 765 compared with the FIG. 7A Sprag embodiment. The Sprags are eliminated in FIG. 7B. The reciprocating output diagram for a typical DDMotion speed converter for one of a MHK and a wind turbine having a shaft input 701 (Propeller shaft or waterwheel shaft), the shaft input being controlled by a control shaft 704 having an overlapping sleeve and Transgear assemblies for regulating an output 705, 755. The output according to the present invention may be further regulated by use of VPG 757, 758 to control stator 758 to a constant output velocity of, for example, 60 Hz. Per FIG. 7A, right sun gear/sleeve/sheath 704 controls the eccentricity of variable pitch cams. The small bores in the outer cams (no reference numeral shown) may be housed by outer cam pins. The outer cam pins may control the outer cam position since they are also located in slots of slotted gears (the three large gears, not numbered, meshing with gears 702). In this manner, a reciprocating motion is performed that may be used per FIG. 7B as concentric/eccentric cam 756 associated with driver 759 regulates VPG 757, 758 in FIG. 7B. The eccentric/concentric cams 756 (FIG. 6A, FIG. 6B are driven by driver 759. Further details of a variable pitch cam 756 and associated driver 759 are shown and described in detail by corresponding description in the specification of FIGS. 7 and 9, respectively, of U.S. Pat. No. 8,641,570 for describing a cam-controlled speed converter of FIG. 10, shown in this patent application as FIG. 7A.

Typical Applications include wind Turbines, MHK Turbines and other power generating turbines. Advantages include: scalable, reduced cost, size, weight, and a potential repair in the future.

The principles of application of the several discussed embodiments of a structure and method of constructing same for, for example, providing a green energy alternative to the burning of fuel such as coal, oil or other less environmentally friendly energy sources have been demonstrated above using a VPG. The present embodiments used in conjunction with known flow energy turbine systems may be enhanced by using many known control systems for improved operation such as pitch and yaw control in wind turbines, control responsive to power grid statistics and requirements and remote or automatic control responsive to predicted and actual weather conditions (wind velocity from an anemometer, water flow velocity from a water flow velocity meter, barometric reading and direction (rising or falling) and the like). These and other features of embodiments and aspects of a variable flow input, constant output system and method may come to mind from reading the above detailed description, and any claimed invention should be only deemed limited by the scope of the claims to follow. Moreover, the Abstract should not be considered limiting. Any patent applications, issued patents and citations to published articles should be considered incorporated by reference herein in their entirety.

What I claim is:

1. An adjustable assembly of rotor and stator comprising a variable power generator coupled to an input shaft and to an output shaft, the variable power generator comprising a rotor and a stator axially adjustable along the output shaft so that the rotor may be displaced with respect to the stator or the stator may be displaced with respect to the rotor, the variable power generator with a minimum displacement and complete overlap of rotor and stator and a maximum torque value in one position and with a maximum displacement and relative non-overlap of rotor and stator and a minimum torque value in another position, the input shaft for rotating at a variable rotational velocity and the output shaft for rotating at a different rotational velocity, a sensor for sensing one of phase angle, torque, input shaft velocity and output shaft velocity and an adjustment control responsive to the sensor for controlling an adjustment of the position of the rotor with respect to the stator or the stator with respect to the rotor of the variable power generator, and a controller responsive to the sensor, the controller having a first port connected to a power grid and a second port responsive to the sensor, the first port for continuously adjusting one of the stator and the rotor with respect to the rotor and the stator respectively, the first port and the second port being controlled by the controller to match frequency and voltage values of the output of the marine hydrokinetic electric power generator to the frequency and voltage values of the power grid via the continuous adjustment control.

2. The adjustable assembly of rotor and stator of claim 1 wherein the sensor comprises a sensor of phase angle, the adjustable assembly of rotor and stator further comprising a motor for adjusting the relative rotor and stator position to synchronize the phase angle.

3. The adjustable assembly or rotor and stator of claim 2 wherein the motor comprises a servo motor for adjusting the position of the stator with respect to the rotor, the rotor being integral with or connected to the output shaft.

4. The adjustable assembly of rotor and stator of claim 3 wherein the stator outputs a constant value of electric power frequency compared with the variable rotational speed of one of a wind turbine input shaft given a varying amount of input wind and a MHK turbine input shaft given a varying water flow velocity.

5. The adjustable assembly of rotor and stator of claim 1 wherein the sensor comprises a sensor of phase angle, the adjustable assembly of rotor and stator further comprising a spur/helical planetary gear assembly for controlling the phase angle relationship between rotor and stator.

6. The adjustable assembly of rotor and stator of claim 5, the variable power generator having the input shaft for driving a second shaft surrounded by first and second sleeves and first and second sun gears integral with or attached to the first and second sleeves respectively of the spur/helical planetary gear assembly, the variable power generator further comprising a variable power generator having one of the rotor and stator coupled to the output shaft, the spur/helical planetary gear assembly adjusting a position of the stator axially with respect to the rotor of the variable power generator for providing a constant output current frequency.

7. The adjustable assembly of rotor and stator of claim 6 wherein the variable power generator is coupled to a second gear attached to or integral with the first sleeve surrounding the second shaft, the second gear for meshing with a gear of the variable power generator.

8. The adjustable assembly of rotor and stator of claim 6 wherein the spur/helical planetary gear assembly comprises one of greater than or equal to three assignable variables to one of input, output and control and a plurality of three assignable variable planetary gear assemblies.

9. The adjustable assembly of rotor and stator of claim 1 wherein the sensor comprises a sensor of one of input shaft and output shaft rotational velocity and the sensor provides an output to control hatch position with respect to a waterwheel of a marine hydrokinetic turbine and an output for controlling the variable power generator electric output to a relatively constant frequency.

10. The adjustable assembly of rotor and stator as recited in claim 1 wherein a shaft coupled to one of the stator and the rotor comprises one of an input shaft and an output shaft of one of a wind turbine and a marine hydrokinetic turbine.

11. The adjustable assembly of rotor and stator as recited in claim 1 wherein a shaft coupled to one of the stator and the rotor comprises an output shaft of one of a wind turbine and a marine hydrokinetic turbine for driving a generator of electric power at constant rotational velocity for delivery to an electric power grid.

12. The adjustable assembly of rotor and stator as recited in claim 1 wherein a shaft coupled to one of the stator and the rotor comprises the output shaft, the output shaft being for speed conversion of a speed converter.

13. The adjustable assembly of rotor and stator as recited in claim 12, the speed converter comprising a cam controlled speed converter, the cam control comprising an inner cam and a surrounding outer cam, the inner cam having a central shaft, the inner cam being moveable from a position of being concentric and having a minimum eccentricity to a position of maximum eccentricity profile for operation with a driver.

14. The adjustable assembly of rotor and stator as recited in claim 13, the cam controlled speed converter further comprising a three variable spur/helical gear assembly for providing a control input to the adjustable assembly of rotor and stator.

15. An electronically controlled variable power generator comprising an input shaft and gear assembly for increasing rotational speed of a shaft of a variable power generator comprising a rotor and stator moveable with respect to one another, the variable power generator having the variable power generator shaft integral with or attached to the rotor of the variable power generator, the variable power generator further comprising the stator axially surrounding the rotor and displaceable with respect to the rotor by a motor, the variable power generator further comprising an electronic control comprising a program controlled computer processor responsive to a sensor for sensing phase, frequency and voltage of a power grid and generator input shaft rotational velocity, the program controlled computer processor having a memory, the electronic control for receiving a rotational velocity measure of the variable power generator input shaft via the sensor and for determining a desired position of the stator with respect to the rotor for constant power output frequency and voltage to an electric power grid and in phase with the electric power grid power with respect to a variable input shaft rotational velocity.

16. The electronically controlled variable power generator of claim 15 for use in a wind turbine for regulating variable wind velocity with respect to constant desired electric power output frequency and voltage.

17. The electronically controlled variable power generator of claim 15 further comprising the input shaft of the electronically controlled variable power generator coupled to the variable power generator shaft through a gearbox.

18. The electronically controlled variable power generator of claim 15 wherein the variable power generator comprising the rotor and the stator moveable with respect to one another has a displacement control assembly comprising a servo motor, a control box connected to the servo motor and a worm and worm gear connected to the servo motor for adjusting the stator axial position with respect to the rotor.

19. A cam-controlled speed converter for producing a constant output speed from a variable input speed, the cam-controlled speed converter comprising a driver assembly having an infinitely variable eccentric cam of an output shaft, the output shaft having a rotor of a variable power generator integral with or attached to the output shaft, the speed converter further comprising an input shaft having a variable speed of rotation coupled to a control shaft, the output shaft further having the variable power generator further comprising a stator surrounding the output shaft, the rotor and stator of the variable power generator being displaceable from a position of maximum overlap to a position of minimum overlap for regulating power output to a grid at relatively constant frequency via the output shaft.

20. The cam-controlled speed converter of claim 19, the driver assembly reciprocating to generate a relatively constant electric power output frequency via the output shaft.

* * * * *